(12) United States Patent
Claus et al.

(10) Patent No.: US 12,602,723 B2
(45) Date of Patent: *Apr. 14, 2026

(54) SYSTEM AND METHOD FOR APPORTIONING TRADING ORDERS BASED ON SIZE OF DISPLAYED QUANTITIES

(71) Applicant: BGC PARTNERS, INC., New York, NY (US)

(72) Inventors: Matthew W. Claus, Summit, NJ (US); Kevin M. Foley, New York, NY (US); Joseph C. Noviello, Summit, NJ (US); Howard W. Lutnick, New York, NY (US)

(73) Assignee: BGC PARTNERS, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,184

(22) Filed: Jun. 20, 2024

(65) Prior Publication Data

US 2024/0338758 A1 Oct. 10, 2024

Related U.S. Application Data

(63) Continuation of application No. 18/144,914, filed on May 9, 2023, now abandoned, which is a continuation of application No. 17/400,201, filed on Aug. 12, 2021, now Pat. No. 11,651,423, which is a continuation of application No. 16/516,323, filed on Jul. 19, 2019, now Pat. No. 11,094,004, which is a continuation of application No. 13/936,789, filed on Jul. 8, 2013, now Pat. No. 10,395,310, which is a continuation of application No. 11/499,496, filed on Aug. 3, 2006, now Pat. No. 8,484,122.

(60) Provisional application No. 60/705,769, filed on Aug. 4, 2005.

(51) Int. Cl.
G06Q 40/00 (2023.01)
G06Q 40/04 (2012.01)

(52) U.S. Cl.
CPC ............. *G06Q 40/00* (2013.01); *G06Q 40/04* (2013.01)

(58) Field of Classification Search
CPC ............................... G06Q 40/00; G06Q 40/04
See application file for complete search history.

(56) References Cited

U.S. PATENT DOCUMENTS 7,246,092 B1* 7/2007 Peterson ................ G06Q 40/04
705/40
2002/0073016 A1* 6/2002 Furbush ............. G06Q 30/0641
705/37

* cited by examiner

*Primary Examiner* — Scott S Trotter

(57) ABSTRACT

An apparatus for processing trade orders comprises a processor and memory that stores first and second orders. The first order is associated with a product and comprises displayed and reserved quantities. The second order is associated with the product and comprises displayed and reserved quantities. The processor is coupled to the memory and receives a counterorder associated with the product. The processor fills the displayed quantity of the first order with a corresponding portion of the counterorder, and the displayed quantity of the second order with a corresponding portion of the counterorder. The processor allocates a first additional portion of the counterorder to the first order. The first additional portion is based at least in part on a ratio of the displayed quantity of the first order to a sum of the displayed quantity of the first order and the displayed quantity of the second order.

20 Claims, 2 Drawing Sheets

| ORDER | ORDER TYPE | TIME | DISPLAYED QUANTITY | RESERVED QUANTITY | REMAINING ALLOCATION |
|---|---|---|---|---|---|
| 102 | 104 | 106 | 108 | 110 | 112 |
| 14p | BUY | 2:00 PM | 10 SHARES | 100 SHARES | 5 SHARES |
| 14q | BUY | 2:01 PM | 20 SHARES | 100 SHARES | 10 SHARES |
| 14r | BUY | 2:02 PM | 30 SHARES | 100 SHARES | 15 SHARES |
| 14s | BUY | 2:03 PM | 40 SHARES | 100 SHARES | 20 SHARES |
| 16z | SELL | 2:04 PM | 150 SHARES | 0 SHARES | 50 SHARES |

SYSTEM AND METHOD FOR APPORTIONING TRADING ORDERS BASED ON SIZE OF DISPLAYED QUANTITIES

CROSS-REFERENCE TO RELATED APPLICATIONS

This patent application is a continuation of U.S. patent application Ser. No. 18/144,914 filed May 9, 2023, which is a continuation of U.S. patent application Ser. No. 17/400, 201 filed Aug. 12, 2021 (now U.S. Pat. No. 11,651,423 issued May 16, 2023), which is a continuation of U.S. patent application Ser. No. 16/516,323 filed Jul. 19, 2019 (now U.S. Pat. No. 11,094,004 issued Aug. 17, 2021), which is a continuation application of U.S. patent application Ser. No. 13/936,789 filed Jul. 8, 2013 (now U.S. Pat. No. 10,395,310 issued Aug. 27, 2019), which is a continuation of U.S. application Ser. No. 11/499,496 filed Aug. 3, 2006 (now U.S. Pat. No. 8,484,122 issued Jul. 9, 2013), which claims priority to U.S. Provisional Patent Application No. 60/705, 769 filed Aug. 4, 2005, each of which is incorporated by reference herein in its entirety.

TECHNICAL FIELD OF THE INVENTION

The present invention relates generally to electronic trading and more specifically to a system for apportioning trading orders based on size of displayed quantities.

BACKGROUND OF THE INVENTION

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures contracts, oil, and gold.

Many of these electronic trading systems use a bid/offer process in which bids and offers are submitted to the systems by a passive side and then those bids and offers are hit or lifted (or taken) by an aggressive side. For example, a passive trading counterparty may submit a "bid" to buy a particular trading product. In response to such a bid, an aggressive side counterparty may submit a "hit" in order to indicate a willingness to sell the trading product to the first counterparty at the given price. Alternatively, a passive side counterparty may submit an "offer" to sell the particular trading product at the given price, and then the aggressive side counterparty may submit a "lift" (or "take") in response to the offer to indicate a willingness to buy the trading product from the passive side counterparty at the given price.

SUMMARY OF THE INVENTION

In accordance with the present invention, the disadvantages and problems associated with prior electronic trading systems have been substantially reduced or eliminated.

An apparatus for processing trading orders comprises a memory and a processor. The memory stores a first order and a second order. The first order is associated with a product and comprises a displayed quantity and a reserved quantity. The second order is associated with the product and comprises a displayed quantity and a reserved quantity. The processor is coupled to the memory and receives a counterorder associated with the product. The processor fills the displayed quantity of the first order with a corresponding portion of the counterorder, and fills the displayed quantity of the second order with a corresponding portion of the counterorder. The processor allocates a first additional portion of the counterorder to the first order. The first additional portion is based at least in part on a ratio of the displayed quantity of the first order to a sum of the displayed quantity of the first order and the displayed quantity of the second order.

Various embodiments of the present disclosure may benefit from numerous advantages. It should be noted that one or more embodiments may benefit from some, none, or all of the advantages discussed below.

One advantage is that the trading platform of the present system allocates counterorders to the reserved quantities of orders in proportion to the size of the displayed quantity of each order. As a result, the larger the displayed quantity of a particular order, the greater the number of shares allocated to the reserved quantity of that order from a counterorder. Accordingly, the system creates incentives for greater transparency in the marketplace by rewarding traders that display a larger portion of a given order. Greater transparency in the marketplace may lead to greater liquidity in the markets.

Other advantages will be readily apparent to one having ordinary skill in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figures 1, 2:
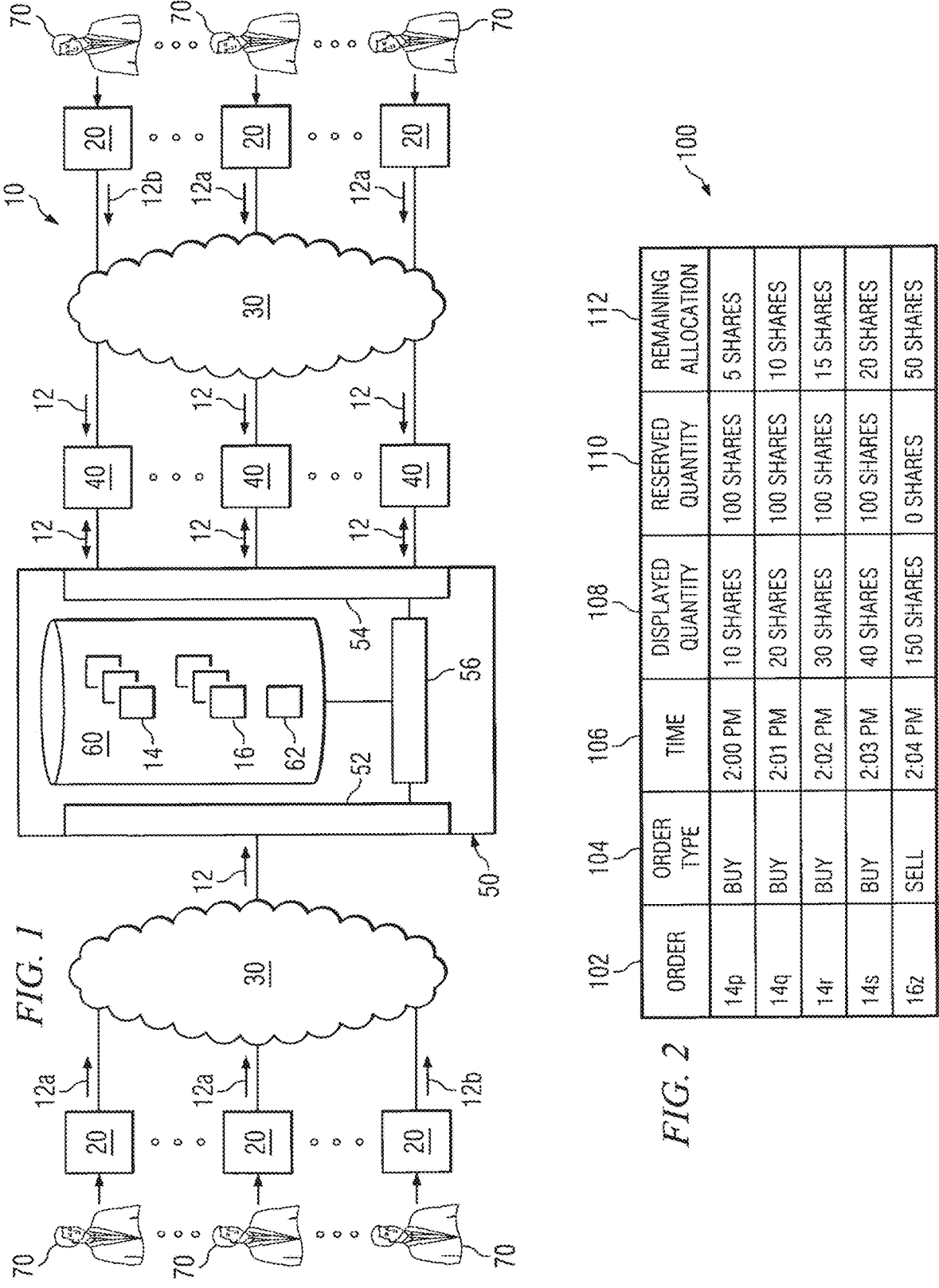
FIG. 1 illustrates one embodiment of a trading system in accordance with the present invention.
FIG. 2 illustrates one embodiment of trading information used by the system illustrated in FIG. 1.

FIG. 1 illustrates one embodiment of a trading system 10. Generally, trading system 10 comprises a trading platform 50 communicatively connected to clients 20, networks 30, and market centers 40. Trading platform 50 may receive and process trading orders 12 from traders 70. By regulating the manner and sequence in which trading orders 12 are filled, trading platform 50 may create incentives for increased disclosure of trading orders 12.

A given trading order 12 may comprise two parts—a "displayed quantity" and a "reserved quantity." In placing trading order 12, trader 70 may indicate that only a portion of the total quantity of trading order 12 should be displayed to other traders 70. This portion of trading order 12 to be displayed to other traders 70 is referred to as the "displayed quantity." The remaining portion of trading order 12 is referred to as the "reserved quantity." Designating a portion of trading order 12 as a "reserved quantity" allows trader 70 to enter a large trading order 12 while only displaying a portion of that trading order 12 to other traders 70. Trading platform 50 may incrementally fill a particular trading order 12 by first filling the displayed quantity of that trading order 12 and then using the reserved quantity to replenish the displayed quantity of that trading order 12.

Trading orders 12 generally comprise orders 12a and counterorders 12b. Orders 12a and counterorders 12b may be buy orders 14 and sell orders 16. Orders 12a and counterorders 12b are complementary actions such as, for example, buying and selling. If an order 12a refers to a buy order 14, then a counterorder 12b refers to a sell order 16. Conversely, if an order 12a refers to a sell order 16, then a counterorder 12b refers to a buy order 14. A buy order 14 is a request to buy a particular quantity of a particular trading product (e.g., bid request). A sell order 16 is a request to sell a particular quantity of a particular trading product (e.g., offer request). In particular embodiments, trading order 12 may specify a target price (e.g., target bid price or target offer price) for the trading product. Although system 10 is exemplified below using equities as the trading product, the trading product that forms the basis of trading order 12 may comprise any goods, services, financial instruments, commodities, etc. Examples of financial instruments include, but are not limited to, stocks, bonds, and futures contracts.

Clients 20 are operable to receive trading orders 12 from traders 70 and to send trading orders 12 to trading platform 50 and/or market centers 40. Clients 20 comprise any suitable local or remote end-user devices that may be used by traders 70 to access one or more elements of trading system 10, such as trading platform 50. A particular client 20 may comprise a computer, workstation, telephone, Internet browser, electronic notebook, Personal Digital Assistant (PDA), pager, or any other suitable device (wireless or otherwise), component, or element capable of receiving, processing, storing, and/or communicating information with other components of system 10. Client 20 may also comprise any suitable user interface such as a display, microphone, keypad, keyboard, touch screen, or any other appropriate terminal equipment according to particular configurations and arrangements. It will be understood that there may be any number of clients 20 communicatively connected to trading platform 50. In addition, there may be any number of clients 20 communicatively connected to market centers 40 without using trading platform 50.

Although clients 20 are described herein as being used by "traders" 70, it should be understood that the term "trader" is meant to broadly apply to any user of trading system 10, whether that user is an agent acting on behalf of a principal, a principal, an individual, a legal entity (such as a corporation), or any machine or mechanism that is capable of placing and/or responding to trading orders 12 in system 10.

According to certain embodiments, traders 70 may include market makers. A market maker may include any individual or firm that submits and/or maintains either or both bid and offer trading orders 12 simultaneously for the same instrument. For example, a market maker may include an individual or firm, such as a brokerage or bank, that maintains either a firm bid and/or offer price in a given security by standing ready, willing, and able to buy and/or sell that security at publicly quoted prices. A market maker generally displays bid and/or offer prices for specific numbers of specific securities, and if these prices are met, the market maker will immediately buy for and/or sell from its own accounts. According to certain embodiments, a single trading order 12 may be filled by a number of market makers at potentially different prices.

Networks 30 are communication platforms operable to exchange data or information between clients 20 and trading platform 50 and/or market centers 40. According to certain embodiments, a particular network 30 may represent an Internet architecture which provides clients 20 with the ability to communicate trading or transaction information to trading platform 50 and/or market centers 40. According to certain embodiments, network 30 comprises a plain old telephone system (POTS), which traders 70 may use to perform the same operations and functions. Transactions may be assisted by a broker associated with trading platform 50 or manually keyed into a telephone or other suitable electronic device to request that a transaction be executed. In certain embodiments, network 30 may be any packet data network (PDN) offering a communications interface or exchange between any two nodes in system 10. Network 30 may further comprise any combination of local area network (LAN), metropolitan area network (MAN), wide area network (WAN), wireless local area network (WLAN), virtual private network (VPN), intranet, or any other appropriate architecture or system that facilitates communications between clients 20 and trading platform 50 and/or market centers 40. Market centers 40 comprise all manner of order execution venues including exchanges, Electronic Communication Networks (ECNs), Alternative Trading Systems (ATSs), market makers, or any other suitable market participants. Each market center 40 maintains a bid and offer price for a given trading product by standing ready, willing, and able to buy or sell that trading product at publicly quoted prices, also referred to as market center prices. Different market centers 40 may provide different market center prices for particular trading products. For example, a particular market center 40 may offer a particular bid price and/or offer price for a particular trading product, while another market center 40 may offer a different bid price and/or offer price for the same trading product. A particular market center 40 may charge a transaction cost to execute trading orders 12 that remain in the order books of that market center 40 for more than a certain length of time. Different market centers 40 may have different policies regarding the disclosure of various details of trading orders 12. For example, certain market centers 40 referred to as "cooperative" market centers may disclose both the displayed quantities and the reserved quantities of trading orders 12 to trading platform 50. Other market centers 40 referred to as "non-cooperative" market centers may disclose only the displayed quantities of trading orders 12 to trading platform 50.

Trading platform 50 is a trading architecture that facilitates the routing, matching, and otherwise processing of trading orders 12. Trading platform 50 may comprise a management center or a headquartering office for any person, business, or entity that seeks to route, allocate, match, process, or fill trading orders 12. Accordingly, trading platform 50 may include any suitable combination of hardware, software, personnel, devices, components, elements, or objects that may be utilized or implemented to achieve the operations and functions of an administrative body or a supervising entity that manages or administers a trading environment. In certain embodiments, trading platform 50 comprises client interface 52, market interface 54, processor 56, and memory module 60.

Client interface 52 of trading platform 50 is communicatively connected to network 30 and supports communications between clients 20 and the various components of trading platform 50. According to certain embodiments, client interface 52 comprises a transaction server that receives trading orders 12 communicated by clients 20 via network 30.

Market interface 54 is communicatively connected to market centers 40 and supports communications between market centers 40 and the various components of trading platform 50. Market interface 54 may comprise a transaction server that receives trading orders 12 communicated by market centers 40. Market interface 54 may be operable to send to market centers 40 trading orders 12 received from clients 20 connected directly to trading platform 50.

Client interface 52 and market interface 54 are communicatively connected to processor 56. Processor 56 is operable to record trading orders 12 in memory module 60 and route trading orders 12 to market centers 40. Processor 56 is further operable to execute logic 62 stored in memory module 60 to match buy orders 14 and sell orders 16 received by client interface 52 and market interface 54. In addition, processor 56 is operable to incrementally fill a particular trading order 12 by using the reserved quantity of that trading order 12 to replenish the displayed quantity of that trading order 12. Processor 56 may comprise any suitable combination of hardware and software implemented in one or more modules to provide the described function or operation.

Memory module 60 comprises any suitable arrangement of random access memory (RAM), read only memory (ROM), magnetic computer disk, CD-ROM, or other magnetic or optical storage media, or any other volatile or non-volatile memory devices that store one or more files, lists, tables, or other arrangements of information such as trading orders 12. Although FIG. 1 illustrates memory module 60 as internal to trading platform 50, it should be understood that memory module 60 may be internal or external to components of trading system 10, depending on particular implementations. Also, memory module 60 illustrated in FIG. 1 may be separate or integral to other memory devices to achieve any suitable arrangement of memory devices for use in trading system 10.

According to certain embodiments, memory module 60 comprises logic 62. Generally, logic 62 comprises software instructions for routing, matching, processing, or filling trading orders 12. Processor 56 is operable to execute logic 62 in memory module 60 to match buy orders 14 and sell orders 16 and to determine the priority of traders 70 associated with those buy orders 14 and sell orders 16. Processor 56 is further operable to execute logic 62 in memory module 60 to determine the manner in which to replenish the displayed quantity of a particular trading order 12. Generally, the manner and sequence in which trading orders 12 are filled is based at least in part on the sequence in which trading platform 50 receives each trading order 12. In certain embodiments, the manner and sequence in which trading orders 12 are filled is also based at least in part on the size of the displayed quantity of a particular trading order 12 relative to the size of the reserved quantity of that trading order 12. By regulating the manner and sequence in which trading orders 12 are filled, trading platform 50 may create incentives for increased disclosure of trading orders 12.

It should be understood that the internal structure of trading platform 50 and the interfaces, processors, and memory devices associated therewith is malleable and can be readily changed, modified, rearranged, or reconfigured in order to achieve the intended operations of trading platform 50.

Trading platform 50 may process trading orders 12 according to logic 62 stored in memory module 60. Logic 62 may dictate the manner and sequence in which trading orders 12 are filled. According to certain embodiments, logic 62 may cause processor 56 to first fill the displayed quantities of trading orders 12 in chronological order. In some embodiments, logic 62 may then cause processor 56 to fill the reserved quantities of trading orders 12 in proportion to the size of the displayed quantity of each trading order 12.

FIG. 2 is a table 100 that sets forth an example illustrating certain embodiments of system 10. Trading platform 50 receives buy orders 14p, 14q, 14r, and 14s at 2:00 p.m., 2:01 p.m., 2:02 p.m., and 2:03 p.m., respectively, as illustrated in columns 102 and 106. Each buy order 14 is for shares of product A. Buy order 14p has a displayed quantity of 10 shares and a reserved quantity of 100 shares, as illustrated in columns 108 and 110, respectively. Buy order 14q has a displayed quantity of 20 shares and a reserved quantity of 100 shares. Buy order 14r has a displayed quantity of 30 shares and a reserved quantity of 100 shares. Buy order 14s has a displayed quantity of 40 shares and a reserved quantity of 100 shares. At 2:04 p.m., trading platform receives sell order 16z for 150 shares of product A. In the present example, logic 62 comprises a rule to first fill the displayed quantities of orders 12a in the sequence that trading platform 50 received those orders 12a. Accordingly, processor 56 first fills the displayed quantity of buy order 14p with 10 shares of product A from sell order 16z. Processor 56 next fills the displayed quantity of buy order 14q with 20 shares of product A from sell order 16z. Processor 56 then fills the displayed quantity of buy order 14r with 30 shares of product A from sell order 16z. Processor 56 next fills the displayed quantity of buy order 14s with 40 shares of product A from sell order 16z. At this point, the displayed quantities of all buy orders 14 have been filled and there are 50 remaining shares of product A from sell order 16z.

In the present example, logic 62 comprises a second rule. The second rule is to divide and allocate, once the displayed quantities of all orders 12a are filled, any remaining portion of counterorder 12b to orders 12a according to the ratio of the displayed quantity of a given order 12a to the displayed quantities of all orders 12a. In the present example, the displayed quantities of buy orders 14p, 14q, 14r, and 14s total 100 shares (e.g., 10+20+30+40=100). The displayed quantity of buy order 14p is 10% of the total displayed quantities of buy orders 14 (e.g., 10/100=10%). Based on the second rule in logic 62, processor 56 allocates 10% of the remaining 50 shares of sell order 16z—5 shares—to the reserved quantity of buy order 14p, as illustrated in column 112. The displayed quantity of buy order 14q is 20% of the total displayed quantities of buy orders 14 (e.g., 20/100=20%). Accordingly, processor 56 allocates 20% of the remaining 50 shares of sell order 16z.—10 shares—to the reserved quantity of buy order 14q. The displayed quantity of buy order 14r is 30% of the total displayed quantities of buy orders 14 (e.g., 30/100=30%). Accordingly, processor 56 allocates 30% of the remaining 50 shares of sell order 16z—15 shares—to the reserved quantity of buy order 14r. The displayed quantity of buy order 14s is 40% of the total displayed quantities of buy orders 14 (e.g., 40/100=40%). Accordingly, processor 56 allocates 40% of the remaining 50 shares of sell order 16z—20 shares—to the reserved quantity of buy order 14s.

The preceding example illustrates one method for apportioning the remaining portion of counterorder 12b among orders 12a in proportion to the displayed quantity of each order 12a. According to other embodiments, the remaining portion of the counterorder 12b may be apportioned based on a fraction or a multiple of the percentage of the displayed quantity of each order 12a.

In some embodiments, in addition or as alternatives to the ratio of the displayed quantity of a given order 12a to the displayed quantities of all orders 12a, processor 56 may use other factors in allocating the remaining portion of counterorder 12b among orders 12a. According to certain embodiments, processor 56 may allocate the remaining portion of counterorder 12*b* based at least in part on the amount of time a particular order 12*a* has been in the order books prior to being filled. For example, an order 12*a* that has been in the order books for a long time may receive more of the remaining portion of counterorder 12*b* than another order 12*a* with the same displayed quantity that has not been in the order books for as long. In some embodiments, processor 56 may allocate the remaining portion of counterorder 12*b* based at least in part on the sequence in which orders 12*a* were received by trading platform 50. For example, the first order 12*a* may receive more of the remaining portion of counterorder 12*b* than another order 12*a* with the same displayed quantity as the first order 12*a*. In other embodiments, processor 56 may allocate the remaining portion of counterorder 12*b* based on any suitable number and combination of factors set forth above or hereinafter discovered (e.g., ratio of displayed quantity to reserved quantity; amount of time for order in order book; sequence that orders are received; etc.).

Figure 3:
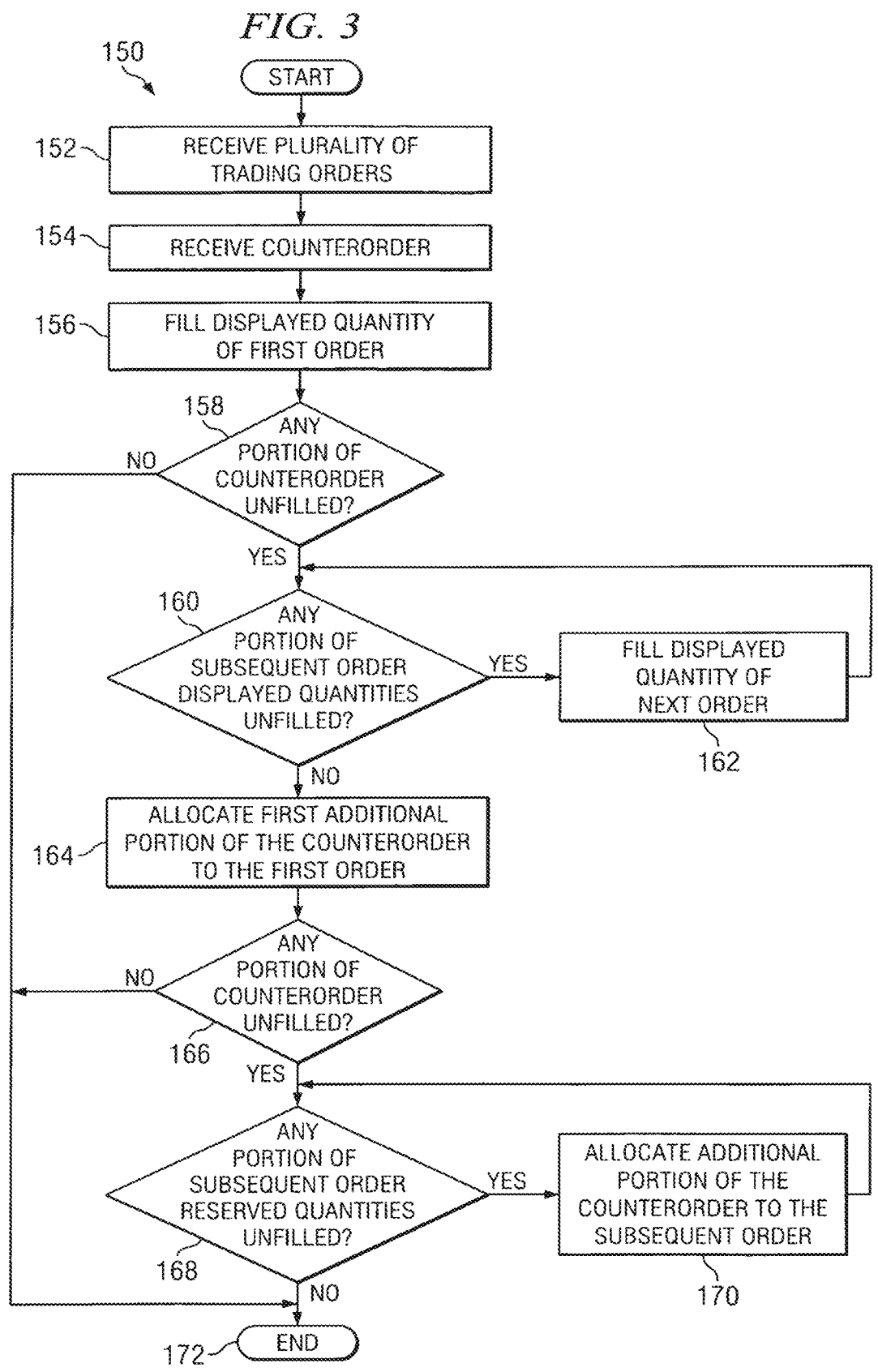
FIG. 3 illustrates a flowchart of an exemplary method for apportioning trading orders based on size of displayed quantities.

FIG. 3 is a flowchart 150 that illustrates one embodiment of a method for processing trading orders 12. It should be understood that additional, fewer, or different operations may be performed in any suitable order to achieve the intended functions without departing from the scope of this method. Trading platform 50 receives a plurality of trading orders 12*a* at step 152. Each trading order 12*a* is associated with a product and has a displayed quantity and a reserved quantity. At step 154, platform 50 receives a counterorder 12*b* specifying a quantity for the product. Platform 50 fills the displayed quantity of the first order 12*a* with a quantity of the counterorder 12*b* at step 156 and determines whether any portion of the counterorder 12*b* remains unfilled at step 158. If not, execution terminates at step 172. If so, execution proceeds to step 160 where the platform 50 determines whether any portion of a displayed quantity for a subsequent order 12*a* remains unfilled. If so, execution proceeds to step 162 where platform 50 fills the displayed quantity of the next order 12*a* with a quantity of the counterorder 12*b*. Steps t 60 and 162 are repeated until the answer to the question at step 160 is a negative response, at which point execution proceeds to step 164.

At step 164, platform 50 allocates a first additional portion of the counterorder 12*b* to the first order 12*a*, according to one or more factors described above (e.g., ratio of displayed quantity to reserved quantity; amount of time for order in order book; sequence that orders are received; etc.). Execution proceeds to step 166 where platform 50 determines whether any portion of the counterorder 12*b* remains unfilled. If not, execution terminates at step 172. If so, execution proceeds to step 168 where platform 50 determines whether any portion of the reserved quantity of a subsequent order 12*a* remains unfilled. If so, execution proceeds to step 170 where platform 50 allocates an additional portion of the counterorder 12*b* to the subsequent order 12*a*, according to one or more factors described above (e.g., ratio of displayed quantity to reserved quantity; amount of time for order in order book; sequence that orders are received; etc.). Steps 168 and 170 are repeated for each subsequent order 12*a* until step 168 is answered with a negative response, at which time execution terminates at step 172.

System 10 has certain technical advantages. Various embodiments of system 10 may have none, some, or all of these advantages. One advantage is that trading platform 50 allocates counterorder 12*b* to the reserved quantities of orders 12*a* in proportion to the size of the displayed quantity of each order 12*a*. As illustrated in the preceding example, the larger the displayed quantity of a particular order 12*a*, the greater the number of shares allocated to the reserved quantity of that order 12*a* from counterorder 12*b*. Accordingly, system 10 creates incentives for greater transparency in the marketplace by rewarding traders 70 that display a larger portion of a given order 12*a*. Greater transparency in the marketplace may lead to greater liquidity in the markets.

Although the present invention has been described in several embodiments, a myriad of changes and modifications may be suggested to one skilled in the art, and it is intended that the present invention encompass such changes and modifications as fall within the scope of the present appended claims.

The invention claimed is:

1. An apparatus comprising:
at least one processor configured to control:
receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded but are not displayed to traders, in which the third order is received at the apparatus after the first order and the second order;
responsive to the first order and the second order being received, displaying, over the communication network, on a display of each of the first trader computer, the second trader computer and the third trader computer, the displayed quantity of the first order and the displayed quantity of the second order;
responsive to the third order being received, refreshing, over the communication network, the display of each of the first, second and third trader computers, to display the displayed quantity of the first order and the displayed quantity of the second order with the displayed quantity of the third order;
receiving, over the communication network, from a fourth trader computer a counterorder associated with the product, the counterorder comprising a quantity;
filling at least the displayed quantity of the first order, the displayed quantity of the second order, and the displayed quantity of the third order with a portion of the counterorder; and
determining a size of an additional portion of the counterorder from a remaining portion of the counterorder that is unfilled based at least in part on a first ratio that is equal to the displayed quantity of the first order divided by a sum of at least the displayed quantity of the first order, the displayed quantity of the second order, and the displayed quantity of the third order.

2. The apparatus of claim 1,
wherein the at least one processor is configured to control determining a size of a further portion of the counterorder from the remaining portion of the counterorder based at least in part on a second ratio that is equal to the displayed quantity of the second order divided by the sum of at least the displayed quantity of the first order, the displayed quantity of the second order, and the displayed quantity of the third order.

3. The apparatus of claim 1, wherein the first, second, and third orders comprise respective buy orders and the counterorder comprises a sell order.

4. The apparatus of claim 1, wherein the first, second, and third orders comprise respective sell orders and the counterorder comprises a buy order.

5. The apparatus of claim 1, wherein the filling at least the displayed quantity of the first order, the displayed quantity of the second order, and the displayed quantity of the third order with the portion of the counterorder comprises:

filling at least the displayed quantity of the first order, the displayed quantity of the second order, and the displayed quantity of the third order with the portion of the counterorder in a same sequence that the first order, the second order, and the third order are received.

6. The apparatus of claim 2, wherein the at least one processor is configured to control:

allocating the further portion of the counterorder to the second order.

7. The apparatus of claim 1, wherein the determining the size of the additional portion of the counterorder comprises determining the size of the additional portion of the counterorder from the remaining portion of the counterorder based at least in part on another ratio that is equal to the displayed quantity of the first order divided by the reserved quantity of the first order.

8. The apparatus of claim 7, wherein the determining the size of the additional portion of the counterorder from the remaining portion of the counterorder further comprises:

multiplying the remaining portion of the counterorder by the first ratio and the another ratio.

9. The apparatus of claim 2, wherein the at least one processor is configured to control: : after determining the size of the further portion of the counterorder from the remaining portion of the counterorder, allocating the additional portion of the counterorder to the first order.

10. The apparatus of claim 1, wherein the receiving at least the first order, the second order, and the third order comprises:

receiving the first order at a first time and the second order at a second time that is subsequent to the first time; and wherein the at least one processor is configured to control:

determining another portion of the counterorder based at least in part on a difference between the first time and the second time; and allocating the another portion of the counterorder to the first order.

11. The apparatus of claim 1, wherein the at least one processor is configured to control:

filling at least a portion of the reserved quantity of the first order with the additional portion of the counterorder.

12. The apparatus of claim 11, wherein the at least one processor is configured to control:

filling at least a portion of the reserved quantity of the second order with the further portion of the counterorder.

13. The apparatus of claim 1, wherein the product comprises a financial instrument.

14. The apparatus of claim 2, wherein the determining the size of the additional portion of the counterorder from the remaining portion of the counterorder comprises:

multiplying the remaining portion of the counterorder by the first ratio.

15. The apparatus of claim 14, wherein the determining the size of the further portion of the counterorder from the remaining portion of the counterorder comprises:

multiplying the remaining portion of the counterorder by the second ratio.

16. The apparatus of claim 15, wherein the first ratio and the second ratio are different values.

17. The apparatus of claim 1, wherein the at least one processor is configured to control:

determining another portion of the counterorder based at least in part on receiving the first order prior to receiving the third order; and allocating the another portion of the counterorder to the first order.

18. The apparatus of claim 2, wherein a sum of the first and second ratios is equal to one.

19. A method comprising:

controlling, by at least one processor:

receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded but are not displayed to traders, in which the third order is received after the first order and the second order;

responsive to the first order and the second order being received, displaying, over the communication network, on a display of each of the first trader computer, the second trader computer and the third trader computer, the displayed quantity of the first order and the displayed quantity of the second order;

responsive to the third order being received, refreshing, over the communication network, the display of each of the first, second and third trader computers, to display the displayed quantity of the first order and the displayed quantity of the second order with the displayed quantity of the third order;

receiving, over the communication network, from a fourth trader computer a counterorder associated with the product, the counterorder comprising a quantity;

filling at least the displayed quantity of the first order, the displayed quantity of the second order, and the displayed quantity of the third order with a portion of the counterorder; and determining a size of an additional portion of the counterorder from a remaining portion of the counterorder that is unfilled based at least in part on a first ratio that is equal to the displayed quantity of the first order divided by a sum of at least the displayed quantity of the first order, the displayed quantity of the second order, and the displayed quantity of the third order.

20. A non-transitory storage medium configured to store instructions that, when executed by a computer, control:

receiving, over a communication network, at least a first order, a second order, and a third order respectively from a first trader computer, a second trader computer and a third trader computer, wherein the first order, the second order, and the third order are associated with a product, the first order comprises a displayed quantity and a reserved quantity, the second order comprises a displayed quantity and a reserved quantity, the third order comprises a displayed quantity and a reserved quantity, and the reserved quantity of the first order, the reserved quantity of the second order, and the reserved quantity of the third order are available to be traded but are not displayed to traders, in which the third order is received after the first order and the second order;

responsive to the first order and the second order being received, displaying, over the communication network, on a display of each of the first trader computer, the second trader computer and the third trader computer, the displayed quantity of the first order and the displayed quantity of the second order;

responsive to the third order being received, refreshing, over the communication network, the display of each of the first, second and third trader computers, to display the displayed quantity of the first order and the displayed quantity of the second order with the displayed quantity of the third order;

receiving, over the communication network, from a fourth trader computer a counterorder associated with the product, the counterorder comprising a quantity;

filling at least the displayed quantity of the first order, the displayed quantity of the second order, and the displayed quantity of the third order with a portion of the counterorder; and determining a size of an additional portion of the counterorder from a remaining portion of the counterorder that is unfilled based at least in part on a first ratio that is equal to the displayed quantity of the first order divided by a sum of at least the displayed quantity of the first order, the displayed quantity of the second order, and the displayed quantity of the third order.

* * * * *